US012788068B2

(12) United States Patent
Zigmund

(10) Patent No.: US 12,788,068 B2
(45) Date of Patent: Nov. 10, 2026

(54) AEROSOL GENERATING SYSTEM AND DEVICE

(71) Applicant: JT International S.A., Geneva (CH)

(72) Inventor: Branislav Zigmund, Vrbovce (SK)

(73) Assignee: JT International SA, Geneva (CH)

( * ) Notice: Subject to any disclaimer, the term of this patent is extended or adjusted under 35 U.S.C. 154(b) by 829 days.

(21) Appl. No.: 17/260,798

(22) PCT Filed: Jul. 24, 2019

(86) PCT No.: PCT/EP2019/069965
§ 371 (c)(1),
(2) Date: Jan. 15, 2021

(87) PCT Pub. No.: WO2020/020970
PCT Pub. Date: Jan. 30, 2020

(65) Prior Publication Data

US 2021/0267280 A1 Sep. 2, 2021

(30) Foreign Application Priority Data

Jul. 26, 2018 (EP) .................................... 18185743

(51) Int. Cl.
*A24F 40/53* (2020.01)
*A24F 40/20* (2020.01)
(Continued)

(52) U.S. Cl.
CPC .............. *A24F 40/53* (2020.01); *A24F 40/20* (2020.01); *A24F 40/465* (2020.01); *A24F 40/57* (2020.01); *A24F 40/60* (2020.01); *H05B 6/08* (2013.01)

(58) Field of Classification Search
None
See application file for complete search history.

(56) References Cited

U.S. PATENT DOCUMENTS

2015/0208727 A1 7/2015 Kuczaj
2017/0055585 A1* 3/2017 Fursa .................... A24F 40/465
(Continued)

FOREIGN PATENT DOCUMENTS

CN 105307524 A 2/2016
CN 107105779 A 8/2017
(Continued)

OTHER PUBLICATIONS

Power in electric circuits: Ohm's law: Electronics textbook. All About Circuits. (n.d.). https://www.allaboutcircuits.com/textbook/direct-current/chpt-2/power-electric-circuits (Year: 2023).*
(Continued)

*Primary Examiner* — Philip Y Louie
*Assistant Examiner* — Nicole A Szumigalski
(74) *Attorney, Agent, or Firm* — Lerner David LLP

(57) ABSTRACT

An aerosol generating system includes an induction heatable susceptor, an induction coil arranged to generate a time varying electromagnetic field for inductively heating the induction heatable susceptor, a power source for supplying power to the induction coil and a controller. The controller is arranged to detect the self-resonant frequency of the induction coil and to control the operation of the aerosol generating system based on the detected self-resonant frequency. An aerosol generating device is also described.

18 Claims, 4 Drawing Sheets

(51) Int. Cl.

| | |
|---|---|
| ***A24F 40/465*** | (2020.01) |
| ***A24F 40/57*** | (2020.01) |
| ***A24F 40/60*** | (2020.01) |
| ***H05B 6/08*** | (2006.01) |
| ***H05B 6/10*** | (2006.01) |

(56) References Cited

U.S. PATENT DOCUMENTS

| | | | | |
|---|---|---|---|---|
| 2017/0280779 | A1* | 10/2017 | Qiu | G05D 23/1919 |
| 2017/0311648 | A1 | 11/2017 | Gill et al. | |

FOREIGN PATENT DOCUMENTS

| | | | | | |
|---|---|---|---|---|---|
| JP | H109082466 | A | | 3/1997 | |
| JP | H09286268 | A | | 11/1997 | |
| JP | 2006114311 | A | | 4/2006 | |
| JP | 2015524260 | A | | 8/2015 | |
| JP | 2016524777 | A | | 8/2016 | |
| WO | 9527411 | A1 | | 10/1995 | |
| WO | 2016198879 | A1 | | 12/2016 | |
| WO | 2017064487 | A1 | | 4/2017 | |
| WO | 2017085242 | A1 | | 5/2017 | |
| WO | WO-2018050701 | A1 | * | 3/2018 | A24D 1/20 |
| WO | 2018178113 | A2 | | 10/2018 | |
| WO | WO-2020020951 | A1 | * | 1/2020 | A24F 40/42 |

OTHER PUBLICATIONS

International Search Report for PCT/EP2019/069965 mailed Nov. 26, 2019; 4 pages.

* cited by examiner

AEROSOL GENERATING SYSTEM AND DEVICE

CROSS-REFERENCE TO RELATED APPLICATIONS

The present application is a national phase entry under 35 U.S.C. § 371 of International Application No. PCT/EP2019/069965, filed Jul. 24, 2019, published in English, which claims priority to European Application No. 18185743.4 filed Jul. 26, 2018, the disclosures of which are incorporated herein by reference.

TECHNICAL FIELD

The present disclosure relates generally to an aerosol generating system, and more particularly to an aerosol generating system for generating an aerosol for inhalation by a user. Embodiments of the present disclosure also relate to an aerosol generating device.

TECHNICAL BACKGROUND

Devices which heat, rather than burn, an aerosol generating material to produce an aerosol for inhalation have become popular with consumers in recent years.

Such devices can use one of a number of different approaches to provide heat to the aerosol generating material. One such approach is to provide an aerosol generating device which employs an induction heating system and into which an aerosol generating article, comprising aerosol generating material, can be removably inserted by a user. In such a device, an induction coil is provided with the device and an induction heatable susceptor is provided with the aerosol generating article. Electrical energy is provided to the induction coil when a user activates the device which in turn generates an alternating electromagnetic field. The susceptor couples with the electromagnetic field and generates heat which is transferred, for example by conduction, to the aerosol generating material and an aerosol is generated as the aerosol generating material is heated.

Embodiments of the present disclosure seek to provide an improved user experience in which the characteristics of the aerosol are optimised through enhanced control of an aerosol generating system and device.

SUMMARY OF THE DISCLOSURE

According to a first aspect of the present disclosure, there is provided an aerosol generating system comprising:

- an induction heatable susceptor;
- an induction coil arranged to generate a time varying electromagnetic field for inductively heating the induction heatable susceptor;
- a power source for supplying power to the induction coil; and
- a controller;
- wherein the controller is arranged to detect the self-resonant frequency of the induction coil and to control the operation of the aerosol generating system based on the detected self-resonant frequency.

The aerosol generating system may be for use with an aerosol generating article, for example comprising an aerosol generating material and the induction heatable susceptor.

According to a second aspect of the present disclosure, there is provided an aerosol generating device comprising:

- a space for receiving an aerosol generating article;
- an induction coil arranged to generate a time varying electromagnetic field;

- a power source for supplying power to the induction coil; and
- a controller;
- wherein the controller is arranged to detect the self-resonant frequency of the induction coil and to control the operation of the aerosol generating device based on the detected self-resonant frequency.

The aerosol generating article that is received, in use, within the space of the aerosol generating device may comprise an aerosol generating material and an induction heatable susceptor.

The aerosol generating system/device is adapted to heat the aerosol generating material, without burning the aerosol generating material, to volatise at least one component of the aerosol generating material and thereby generate an aerosol for inhalation by a user of the aerosol generating system/device.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms 'aerosol' and 'vapour' may be used interchangeably in this specification, particularly with regard to the form of the inhalable medium that is generated for inhalation by a user.

By controlling the operation of the aerosol generating system/device based on the detected self-resonant frequency of the induction coil, dedicated sensors for controlling the operation of the system/device are not needed. The control system can, thus, be simplified which in turn allows the provision of a more compact, efficient and lightweight aerosol generating system/device.

The controller may be arranged to detect the self-resonant frequency of the induction coil at a predetermined time and to control the operation of the aerosol generating system/device based on the detected self-resonant frequency. This arrangement provides a simple but effective control strategy for the system/device.

The controller may be arranged to detect a change in the self-resonant frequency of the induction coil between a first time and a second time and to control the operation of the aerosol generating system/device based on the change in the detected self-resonant frequency. The controller may be arranged to detect the self-resonant frequency of the induction coil at a first time and to detect the self-resonant frequency of the induction coil at a second time and to determine the change in the self-resonant frequency between the first and second times. Monitoring a change in the self-resonant frequency between different times may provide an enhanced control strategy for the system/device.

The controller may be arranged to determine a profile of the self-resonant frequency of the induction coil over a period of time, for example between a first time and a second time. The controller may be arranged to continuously measure the self-resonant frequency of the induction coil to determine the profile of the self-resonant frequency. Continuously monitoring the self-resonant frequency over a period of time may provide an enhanced control strategy for the system/device.

The controller may be arranged to control the amount of power supplied by the power source to the induction coil based on the detected self-resonant frequency. The induction coil forms part of a tuned circuit with the induction heatable susceptor and a change in the temperature of the induction heatable susceptor causes a change in the self-resonant frequency of the induction coil. Thus, it is possible to determine the temperature of the induction heatable susceptor by determining the self-resonant frequency of the induction coil and to suitably control the temperature of the induction heatable susceptor by detecting the self-resonant frequency of the induction coil and controlling the amount of power supplied by the power source to the induction coil based on the detected self-resonant frequency.

The controller may advantageously store a first type of reference value and may be further arranged to control the amount of power supplied by the power source to the induction coil based on the first type of reference value. The first type of reference value may be a self-resonant frequency or a value calculated based on the self-resonant frequency which corresponds to a target temperature of the induction heatable susceptor. Controlling the amount of power supplied by the power source to the induction coil based on the first type of reference value ensures that a suitable amount of power is supplied to the induction coil to enable the temperature of the induction heatable susceptor to be maintained substantially at the target temperature.

For example, if the controller determines that the detected self-resonant frequency or the value calculated based on the self-resonant frequency corresponds to a higher temperature than the target temperature, the controller reduces the amount of power supplied by the power source to the induction coil to modify the self-resonant frequency of the induction coil to thereby reduce the temperature of the induction heatable susceptor to a value substantially equal to the target temperature. Similarly, if the controller determines that the detected self-resonant frequency or the value calculated based on the self-resonant frequency corresponds to a lower temperature than the target temperature, the controller increases the amount of power supplied by the power source to the induction coil to modify the self-resonant frequency of the induction coil to thereby increase the temperature of the induction heatable susceptor to a value substantially equal to the target temperature.

As noted above, the aerosol generating system may be for use with an aerosol generating article comprising an aerosol generating material. The controller may be arranged to detect the type of aerosol generating article used with the aerosol generating system based on the detected self-resonant frequency of the induction coil, for example when the induction coil is supplied with a predetermined amount of power and/or when the induction coil is operated according to a predetermined power profile. The controller may be arranged to indicate to a user the type of aerosol generating article used with the system/device. The user is, thus, automatically informed about the type of aerosol generating article that is used with the system/device.

The controller may store a second type of reference value and may be further arranged to detect the type of aerosol generating article based on the second type of reference value. The second type of reference value may be a self-resonant frequency range or a range calculated based on the self-resonant frequency range which corresponds to a particular type of aerosol generating article.

As noted above, the induction coil forms part of a tuned circuit with the induction heatable susceptor and, thus, the physical properties of the induction heatable susceptor, including, e.g., its material and thickness, influence the self-resonant frequency of the induction coil. Thus, detecting the self-resonant frequency of the induction coil provides a simple and very effective way to detect the type of aerosol generating article used with the aerosol generating system/device and to automatically control the operation of the system/device to ensure that an aerosol with optimum characteristics is generated.

The controller may store a plurality of the second type of reference values and a corresponding plurality of predetermined heating profiles adapted for use with different types of aerosol generating articles. The controller may be arranged to select one of the plurality of predetermined heating profiles based on the plurality of second type of reference values and the detected self-resonant frequency or a value calculated based on the self-resonant frequency. The controller may be arranged to select one of the plurality of heating profiles based on a comparison between the detected self-resonant frequency or a value calculated based on the self-resonant frequency and the plurality of second type of reference values. If the controller determines that the detected self-resonant frequency or the value calculated based on the self-resonant frequency corresponds to a particular stored second type of reference value, the controller selects the heating profile associated with that stored second type of reference value. It will be understood that different types of aerosol generating article, for example with different moisture and humectant content, may require different heating profiles to ensure that an aerosol with optimum characteristics is generated. Different heating profiles may, for example, have one or more of: different rates of heating, different maximum and/or minimum operating temperatures and different time periods for which such operating temperatures are maintained. Selection of a suitable heating profile ensures that an aerosol with optimum characteristics is generated during use of the system/device with different types of aerosol generating articles.

One or more of the plurality of second type of reference values may correspond to an aerosol generating article that is not suitable for use with the aerosol generating system and the controller may be adapted to cease supplying power to the induction coil upon detecting the use of an unsuitable aerosol generating article. Detecting the self-resonant frequency of the induction coil provides a simple and very effective way to detect any attempted use of an unsuitable aerosol generating article with the aerosol generating system/device and to prevent the operation of the system/device in these circumstances. An unsuitable aerosol generating article may include any one or more of an aerosol generating article which is off-specification and unsuitable for use with the aerosol generating system/device, an aerosol generating article which has been previously used and which, upon further use, is incapable of generating an aerosol with suitable characteristics such as flavour and aroma, or an aerosol generating article which has been incorrectly positioned within the aerosol generating system/device.

The controller may be arranged to detect an inhalation by a user of the system based on the detected self-resonant frequency and based on the amount of power supplied by the power source to the induction coil at the time of detection and/or at least part of a predetermined power profile before the time of detection. The controller may store a third type of reference value and may be further arranged to detect an inhalation by a user based on the third type of reference value. Detecting the self-resonant frequency of the induction coil provides a very simple and effective way to detect an inhalation (commonly referred to as a 'puff') by a user without the need for additional sensors or component parts.

The controller may be arranged to:

detect a timing change of an aerosol generating article used with the system based on the detected self-resonant frequency and based on the amount of power supplied by the power source to the induction coil at the time of detection and/or at least part of a predetermined power profile before the time of detection; and indicate the detected timing change and/or cease supplying power to the induction coil.

Detecting the self-resonant frequency of the induction coil provides a very simple and effective way to detect, and to indicate to a user, when an aerosol generating article used with the device needs to be replaced and/or to cease supplying power to the induction coil to ensure that heating of the aerosol generating article does not continue beyond a point in time which would result in the generation of an aerosol with sub-optimal characteristics.

The controller may store a fourth type of reference value and may be further arranged to detect a timing change of an aerosol generating article based on the fourth type of reference value. The fourth type of reference value may be a self-resonant frequency range or a range calculated based on the self-resonant frequency range which corresponds to a target temperature range of the induction heatable susceptor. For example, as the moisture and humectant content of the aerosol generating material is depleted over time, the temperature of the aerosol generating article, and hence of the induction heatable susceptor, tends to increase with continued use. Since the self-resonant frequency of the induction coil is affected by the temperature of the induction heatable susceptor as explained earlier in this specification, a change in the detected self-resonant frequency may indicate that there is insufficient moisture and humectant remaining within the aerosol generating material to produce an aerosol with optimum characteristics. This in turn enables the controller to indicate to a user that the aerosol generating article needs to be replaced and/or to cease supplying power to the induction coil to prevent continued operation of the system/device with the depleted aerosol generating article.

The controller may be arranged to:

detect an unexpected event based on the detected self-resonant frequency and based on the amount of power supplied by the power source to the induction coil at the time of detection and/or at least part of a predetermined power profile before the time of detection; and indicate the detected unexpected event and/or cease supplying power to the induction coil.

The controller may store a fifth type of reference value and may be further arranged to detect an unexpected event based on the fifth type of reference value. The fifth type of reference value may be a self-resonant frequency or a value calculated based on the self-resonant frequency which corresponds to a target temperature of the induction heatable susceptor.

Detecting the self-resonant frequency of the induction coil provides a very simple and effective way to detect and to indicate to a user when an unexpected event occurs and/or to cease supplying power to the induction coil when an unexpected event occurs. As a first example, the unexpected event may be that the temperature of the induction heatable susceptor is less than expected. In this first example, the controller would detect that the self-resonant frequency of the induction coil or the value calculated based on the self-resonant frequency corresponds to a susceptor temperature which is lower than expected. This could, for example, occur in the event of attempted use of the system/device when the ambient temperature is too low which could prevent the generation of an aerosol with optimum characteristics. As a second example, the unexpected event may be that the temperature of the induction heatable susceptor is greater than expected. In this second example, the controller would detect that the self-resonant frequency of the induction coil or the value calculated based on the self-resonant frequency corresponds to a susceptor temperature which is higher than expected. This could, for example, occur in the event of attempted use of the system/device when the ambient temperature is too high which could again prevent the generation of an aerosol with optimum characteristics.

The induction coil may comprise a Litz wire or a Litz cable. It will, however, be understood that other materials could be used. The induction coil may be substantially helical in shape and may, for example, extend around the space in which the aerosol generating article is received in use.

The circular cross-section of a helical induction coil may facilitate the insertion of the aerosol generating article into the aerosol generating system/device, for example into the space in which the aerosol generating article is received in use, and may ensure uniform heating of the aerosol generating material.

The induction heatable susceptor may comprise one or more, but not limited, of aluminium, iron, nickel, stainless steel and alloys thereof, e.g. Nickel Chromium or Nickel Copper. With the application of an electromagnetic field in its vicinity, the susceptor may generate heat due to eddy currents and magnetic hysteresis losses resulting in a conversion of energy from electromagnetic to heat.

A material with a high temperature coefficient of resistance is particularly suitable for determining a change in temperature of the induction heatable susceptor based on the self-resonant frequency of the induction coil. On the other hand, the induction heatable susceptor needs to possess a certain level of resistance to enable it to generate heat in an effective manner. In order to satisfy these two competing requirements, it may be advantageous to employ first and second types of induction heatable susceptors comprising first and second materials respectively. Iron and nickel are examples of materials with a high temperature coefficient of resistance which are suitable for use as the first material. Above mentioned, aluminium, iron, nickel, stainless steel and alloys thereof, e.g. Nickel Chromium or Nickel Copper, are examples for use as the second material.

The induction coil may be arranged to operate in use with a fluctuating electromagnetic field having a magnetic flux density of between approximately 20 mT and approximately 2.0 T at the point of highest concentration.

The aerosol generating system/device may include a power source and circuitry which may be configured to operate at a high frequency. The power source and circuitry may be configured to operate at a frequency of between approximately 80 kHz and 500 kHz, possibly between approximately 150 kHz and 250 kHz, and possibly at approximately 200 kHz. The power source and circuitry could be configured to operate at a higher frequency, for example in the MHz range, depending on the type of inductively heatable susceptor that is used.

The aerosol generating material may be any type of solid or semi-solid material. Example types of aerosol generating solids include powder, granules, pellets, shreds, strands, particles, gel, strips, loose leaves, cut filler, porous material, foam material or sheets. The aerosol generating material may comprise plant derived material and in particular, may comprise tobacco.

The foam material may comprise a plurality of fine particles (e.g. tobacco particles) and can also comprise a volume of water and/or a moisture additive, such as a humectant. The foam material may be porous, and may allow a flow of air and/or vapour through the foam material.

The aerosol generating material may comprise an aerosol-former. Examples of aerosol-formers include polyhydric alcohols and mixtures thereof such as glycerine or propylene glycol. Typically, the aerosol generating material may comprise an aerosol-former content of between approximately 5% and approximately 50% on a dry weight basis. In some embodiments, the aerosol generating material may comprise an aerosol-former content of between approximately 10% and approximately 20% on a dry weight basis, and possibly approximately 15% on a dry weight basis.

The aerosol generating article may comprise an air-permeable shell containing aerosol generating material. The air permeable shell may comprise an air permeable material which is electrically insulating and non-magnetic. The material may have a high air permeability to allow air to flow through the material with a resistance to high temperatures. Examples of suitable air permeable materials include cellulose fibres, paper, cotton and silk. The air permeable material may also act as a filter. Alternatively, the aerosol generating article may comprise an aerosol generating substance wrapped in paper. Alternatively, the aerosol generating material may be contained inside a material that is not air permeable, but which comprises appropriate perforations or openings to allow air flow. The aerosol generating material may be formed substantially in the shape of a stick.

DETAILED DESCRIPTION OF EMBODIMENTS

Embodiments of the present disclosure will now be described by way of example only and with reference to the accompanying drawings.

Figure 1:
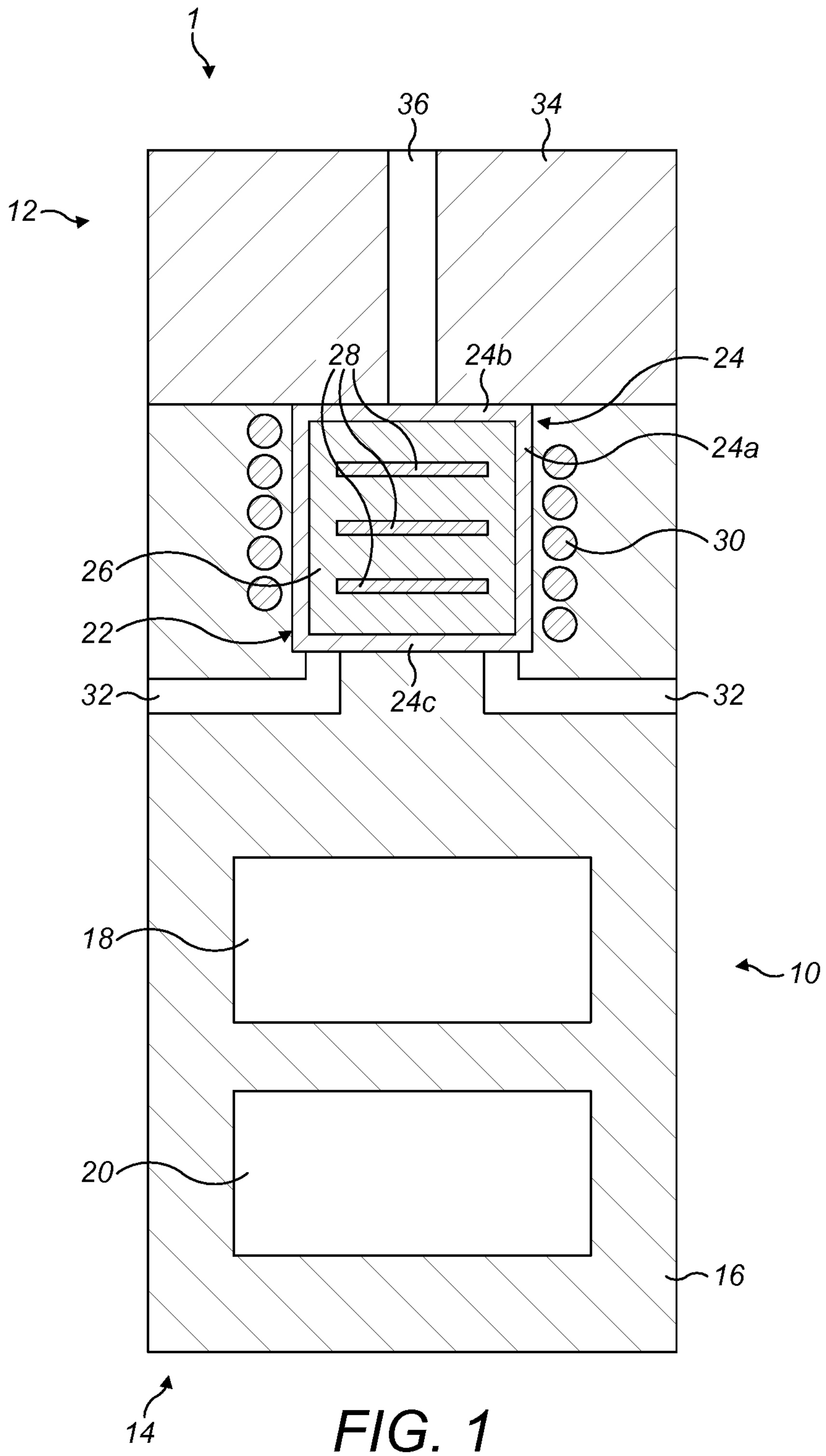
FIG. 1 is a diagrammatic view of an example of an aerosol generating system.

Referring initially to FIG. 1, there is shown diagrammatically an example of an aerosol generating system 1. The aerosol generating system 1 comprises an aerosol generating device 10 and an aerosol generating article 24. The aerosol generating device 10 has a proximal end 12 and a distal end 14 and comprises a device body 16 which includes a power source 18 and a controller 20 which may be configured to operate at high frequency. The power source 18 typically comprises one or more batteries which could, for example, be inductively rechargeable.

The aerosol generating device 10 is generally cylindrical and comprises a generally cylindrical aerosol generating space 22, for example in the form of a heating compartment, at the proximal end 12 of the aerosol generating device 10. The cylindrical aerosol generating space 22 is arranged to receive a correspondingly shaped generally cylindrical aerosol generating article 24 containing an aerosol generating material 26 and one or more induction heatable susceptors 28. The aerosol generating article 24 typically comprises a non-metallic cylindrical outer shell **24*a* and an air-permeable layer or membrane 24*b*, 24*c* at the proximal and distal ends to contain the aerosol generating material 26 and allow air to flow through the aerosol generating article 24. The aerosol generating article 24 is a disposable article which may, for example, contain tobacco as the aerosol generating material 26**.

The aerosol generating device 10 comprises a helical induction coil 30 which has a circular cross-section and which extends around the cylindrical aerosol generating space 22. The induction coil 30 can be energised by the power source 18 and controller 20. The controller 20 includes, amongst other electronic components, an inverter which is arranged to convert a direct current from the power source 18 into an alternating high-frequency current for the induction coil 30.

The aerosol generating device 10 includes one or more air inlets 32 in the device body 16 which allow ambient air to flow into the aerosol generating space 22. The aerosol generating device 10 also includes a mouthpiece 34 having an air outlet 36. The mouthpiece 34 is removably mounted on the device body 16 at the proximal end 12 to allow access to the aerosol generating space 22 for the purposes of inserting or removing an aerosol generating article 24.

As will be understood by one of ordinary skill in the art, when the induction coil 30 is energised during use of the aerosol generating system 1, an alternating and time-varying electromagnetic field is produced. This couples with the one or more induction heatable susceptors 28 and generates eddy currents and/or magnetic hysteresis losses in the one or more induction heatable susceptors 28 causing them to heat up. The heat is then transferred from the one or more induction heatable susceptors 28 to the aerosol generating material 26, for example by conduction, radiation and convection.

The induction heatable susceptor(s) 28 can be in direct or indirect contact with the aerosol generating material 26, such that when the susceptor(s) 28 is/are inductively heated by the induction coil 30, heat is transferred from the susceptor(s) 28 to the aerosol generating material 26, to heat the aerosol generating material 26 and thereby produce an aerosol. The aerosolisation of the aerosol generating material 26 is facilitated by the addition of air from the surrounding environment through the air inlets 32. The aerosol generated by heating the aerosol generating material 26 exits the aerosol generating space 22 through the air outlet 36 where it can be inhaled by a user of the device 10. The flow of air through the aerosol generating space 22, i.e. from the air inlets 32, through the aerosol generating space 22 and out of the air outlet 36, can be aided by negative pressure created by a user drawing air from the air outlet 36 side of the device 10.

The induction coil 30 forms part of a tuned circuit with the induction heatable susceptor(s) 28 of the aerosol generating article 24 and has a self-resonant frequency which may vary. The controller 20 is arranged to detect the self-resonant frequency of the induction coil 30 and to control the operation of the aerosol generating system 1 and device 10 based on the detected self-resonant frequency.

Figure 2:
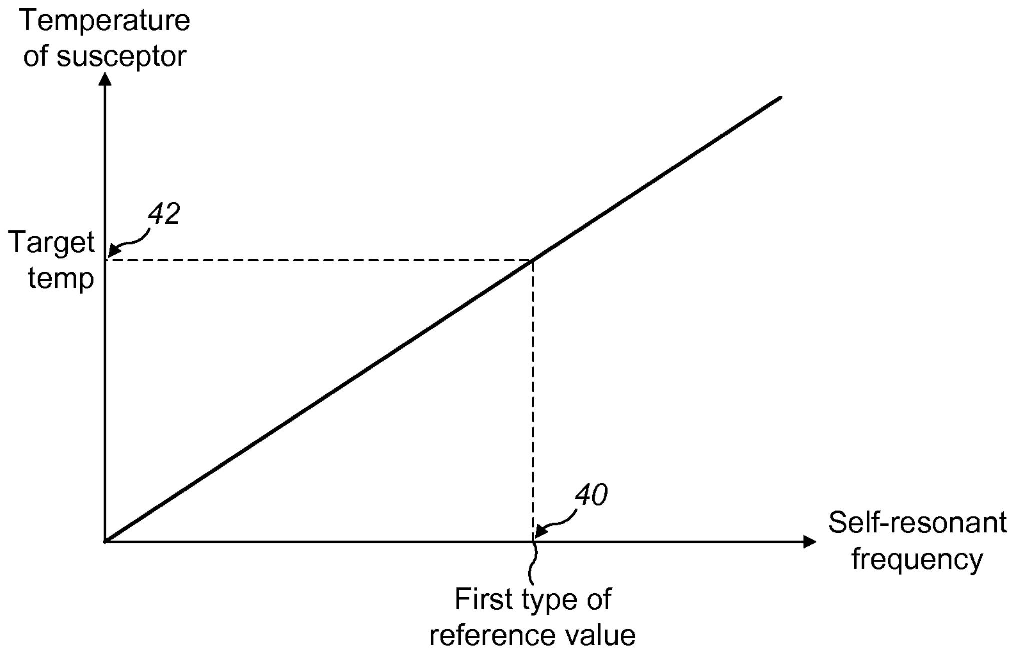
FIG. 2 is a schematic representation of a methodology for temperature control of an aerosol generating article used with the aerosol generating system of FIG. 1.

In a first example illustrated in FIG. 2 which is suitable for controlling the temperature of the aerosol generating article 24, there is a linear relationship between the temperature of the induction heatable susceptor(s) 28 and the self-resonant frequency of the induction coil 30. As noted above, this is because the induction coil 30 forms part of a tuned circuit with the induction heatable susceptor(s) 28 and it therefore follows that a change in the temperature of the induction heatable susceptor(s) 28 causes a change in the self-resonant frequency of the induction coil 30. It is, therefore, possible to indirectly determine the temperature of the induction heatable susceptor(s) 28 by arranging the controller 20 to determine the self-resonant frequency of the induction coil 30. Furthermore, the controller 20 is arranged to control the temperature of the induction heatable susceptor(s) 28 based on the detected self-resonant frequency by controlling the amount of power supplied by the power source 18 to the induction coil 30 based on the detected self-resonant frequency.

In a typical implementation and as best seen in FIG. 2, the controller 20 stores a first type of reference value 40, namely the value of a self-resonant frequency itself or a certain value calculated based on the value of the self-resonant frequency, which corresponds to a target operating temperature 42 of the induction heatable susceptor(s) 28. If the controller 20 determines that the detected value of the self-resonant frequency or the value calculated based on the detected value of the self-resonant frequency differs from, e.g. is higher than, the first type of reference value 40, the controller 20 determines that the temperature of the induction heatable susceptor(s) 28 is higher than the target temperature 42 and reduces the amount of power supplied by the power source 18 to the induction coil 30. In doing so, the temperature of the induction heatable susceptor(s) 28 is reduced to a value which is substantially equal to the target operating temperature thereby shifting the value of the self-resonant frequency of the induction coil 30 or the value calculated based on the value of the self-resonant frequency to a value which is substantially equal to the first type of reference value 40. Similarly, if the controller 20 determines that the detected value of the self-resonant frequency or the value calculated based on the detected value of the self-resonant frequency differs from, e.g. is lower than, the first type of reference value 40, the controller 20 determines that the temperature of the induction heatable susceptor(s) 28 is lower than the target temperature 42 and increases the amount of power supplied by the power source 18 to the induction coil 30. In doing so, the temperature of the induction heatable susceptor(s) 28 is increased to a value which is substantially equal to the target operating temperature thereby shifting the value of the self-resonant frequency of the induction coil 30 or the value calculated based on the value of the self-resonant frequency to a value which is substantially equal to the first type of reference value 40.

Figure 3:
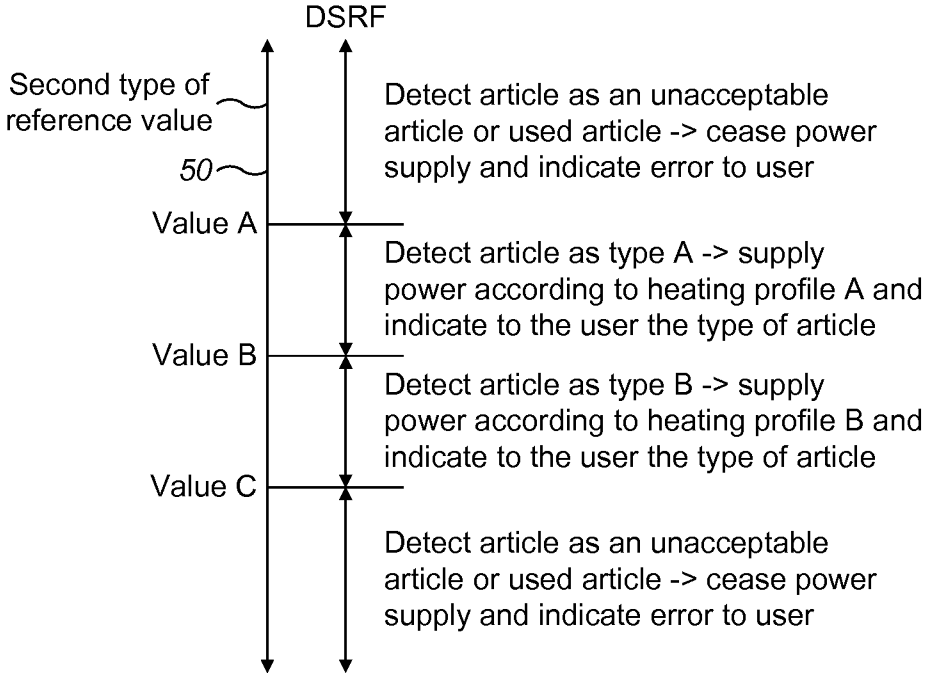
FIG. 3 is a schematic representation of a methodology for detecting a type of aerosol generating article used with the aerosol generating system of FIG. 1.

In a second example illustrated in FIG. 3, the controller 20 is arranged to detect the type of aerosol generating article 24 (e.g. type A or type B) used with the aerosol generating system 1 based on the detected self-resonant frequency of the induction coil 30 or based on a value calculated based on the value of the detected self-resonant frequency when the induction coil 30 is supplied with a predetermined amount of power and/or when the induction coil 30 is operated according to a predetermined power profile. In the illustrated example, the controller 20 stores a plurality of a second type of reference values 50 (e.g. Value A, Value B, Value C).

The particular type of aerosol generating article 24 used with the aerosol generating system 1 can be determined by detecting the self-resonant frequency of the induction coil 30 or a value calculated based on the value of the detected self-resonant frequency because, as noted above, the induction coil 30 forms part of a tuned circuit with the induction heatable susceptor(s) 28. Thus, the physical properties of the induction heatable susceptor(s) 28, including, e.g., material and thickness, influence the self-resonant frequency of the induction coil 30 during operation of the aerosol generating system 1. By positioning one or more induction heatable susceptors 28 with different characteristics inside different types of aerosol generating article 24, the self-resonant frequency of the induction coil 30 can be controlled in a known manner and the self-resonant frequency or a value calculated based on the value of the self-resonant frequency can, thus, be used to reliably detect the type of aerosol generating article 24 that is used with the aerosol generating system 1.

Different types of aerosol generating article 24 may contain different types of aerosol generating material 26 and/or may have different moisture and humectant content. Different types of aerosol generating article 24 may require different heating profiles to ensure that an aerosol with optimum characteristics is generated when the aerosol generating article 24 is used with the aerosol generating device 10. Different heating profiles may, for example, have different rates of heating (e.g. rapid/slow), different maximum and/or minimum operating temperatures and different time periods for which such operating temperatures are maintained.

As mentioned above, the controller 20 stores a plurality of the second type of reference values 50 (Value A, Value B, Value C). The controller 20 also stores a plurality of predetermined heating profiles (heating profile A, heating profile B) which are adapted for use with different types of aerosol generating article 24. In one implementation and following insertion of an aerosol generating article 24 into the aerosol generating space 22, the controller 20 is arranged to detect the self-resonant frequency of the induction coil 30 or a value calculated based on the value of the detected self-resonant frequency and to compare the detected self-resonant frequency or the value calculated based on the value of the detected self-resonant frequency with the plurality of second type of reference values. The controller 20 is arranged to identify the type of aerosol generating article 24 based on the comparison and to select a heating profile based on the comparison. For example, if the controller 20 determines that the detected self-resonant frequency or the value calculated based on the value of the detected self-resonant frequency has a value between A and B as shown in FIG. 3, the controller 20 determines that the aerosol generating article 24 is of type A and selects heating profile A. The controller 20 then controls the power supplied by the power source 18 to the induction coil 30 to provide heating profile A and indicates to a user that an aerosol generating article 24 of type A has been positioned in the aerosol generating space 22. Similarly, if the controller 20 determines that the detected self-resonant frequency or the value calculated based on the value of the detected self-resonant frequency has a value between B and C as shown in FIG. 3, the controller 20 determines that the aerosol generating article 24 is of type B and selects heating profile B. The controller 20 then controls the power supplied by the power source 18 to the induction coil 30 to provide heating profile B and indicates to a user that an aerosol generating article 24 of type B has been positioned in the aerosol generating space 22.

In some implementations, one or more of the plurality of second type of reference values 50 can correspond to aerosol generating articles 24 that are not suitable for use with the aerosol generating system 1. If the controller 20 detects that the self-resonant frequency or the value calculated based on the value of the detected self-resonant frequency corresponds to a second type of reference value which indicates that an aerosol generating article 24 that is not suitable for use with the system 1 has been positioned in the aerosol generating space 22, the controller 20 can terminate the supply of power to the induction coil 30 from the power source 18 and indicate to a user an error state. For example, if the controller 20 determines that the detected self-resonant frequency or the value calculated based on the value of the detected self-resonant frequency is not in the range between Value A and Value C as shown in FIG. 3, the controller 20 determines that the aerosol generating article 24 is not suitable for use with the aerosol generating system 1. The controller 20 then ceases supplying power from the power source 18 to the induction coil 30 and indicates an error state to a user. A typical example of an unsuitable aerosol generating article 24 is an article which is off-specification and unsuitable for use with the aerosol generating system 1. Other non-limiting examples include an aerosol generating article 24 which has been previously used and which, upon further use, is incapable of generating an aerosol with suitable characteristics due to depletion of the aerosol generating material 26 and an aerosol generating article 24 which has been incorrectly positioned within the aerosol generating space 22 thus preventing the induction heatable susceptor(s) from being optimally coupled with the electromagnetic field generated by the induction coil 30.

Figure 4:
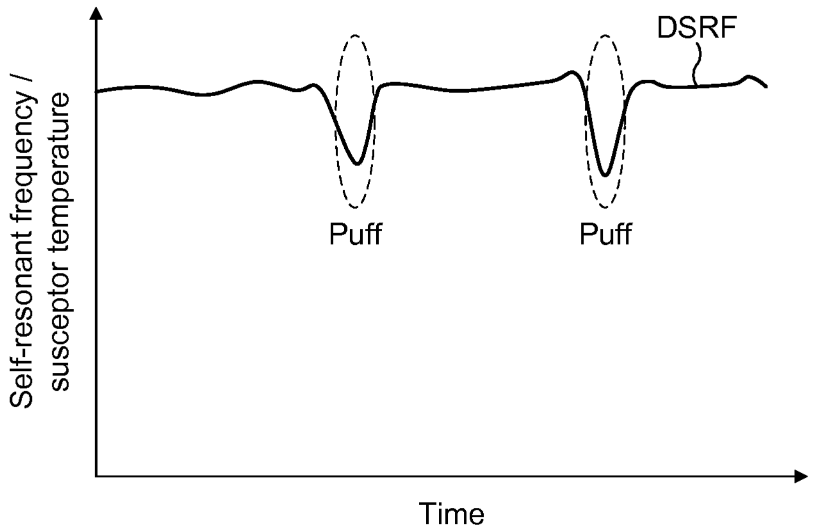
FIG. 4 is a schematic representation of a methodology for detecting inhalation by a user during use of the aerosol generating system of FIG. 1.

In a third example illustrated in FIG. 4, the controller 20 is arranged to detect an inhalation (or puff) by a user of the system 1 based on the detected self-resonant frequency of the induction coil 30 or a certain value calculated based on the value of the detected self-resonant frequency and based on the amount of power supplied by the power source 18 to the induction coil 30 at the time of detection and/or at least part of a predetermined power profile before the time of detection. The controller 20 stores a third type of reference value and may be further arranged to detect a puff by a user based on the third type of reference value.

In one implementation, the controller 20 determines a marker value for a puff (MVP) based on the detected self-resonant frequency (DSRF) as follows:

$$MVP = \frac{\Delta DSRF}{\Delta t}$$

where:

ΔDSRF=DSRF at time a–DSRF at time b; and

Δt=time a–time b.

It will be understood that when a user inhales aerosol through the mouthpiece 34, the flow of ambient air through the air inlets 32 and into the aerosol generating article 24 causes a decrease in the temperature of the aerosol generating article 24 and, hence, a decrease in the temperature of the induction heatable susceptor(s) 28. As explained above in connection with FIG. 2, a decrease in the temperature of the induction heatable susceptor(s) causes a decrease in the self-resonant frequency of the induction coil 30 which is detected by the controller 20. By detecting the change in the self-resonant frequency or a value calculated based on the self-resonant frequency between two predetermined points in time, namely time a and time b, the controller 20 is able to determine the marker value for puff (MVP) in the manner described above. The controller 20 compares the marker value for puff (MVP) with the third type of reference value and, if the controller 20 determines that the marker value for puff (MVP) is greater than the stored third type of reference value, the controller 20 determines that a puff has occurred.

Figure 5:
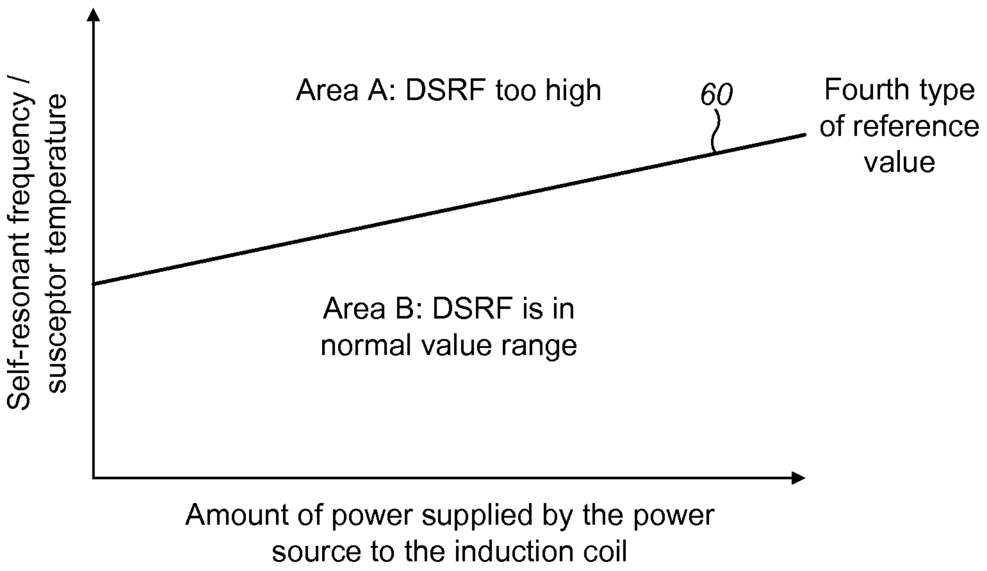
FIG. 5 is a schematic representation of a methodology for detecting the timing change of an aerosol generating article used with the aerosol generating system of FIG. 1.

In a fourth example illustrated in FIG. 5, the controller 20 is arranged to detect a timing change of an aerosol generating article 24 used with the system 1 based on the detected self-resonant frequency or a value calculated based on the value of the detected self-resonant frequency and based on the amount of power supplied by the power source 18 to the induction coil 30 at the time of detection and/or at least part of a predetermined power profile before the time of detection. The controller 20 is also arranged to indicate the detected timing change so that a user can replace the aerosol generating article 24 and/or to cease supplying power to the induction coil to prevent further use of the aerosol generating device 10 until the aerosol generating article 24 has been replaced by the user.

FIG. 5 illustrates a linear relationship between the amount of power supplied by the power source 18 to the induction coil 30 and the self-resonant frequency of the induction coil 30. As will be understood by one of ordinary skill in the art, as the moisture and humectant content of the aerosol generating material 26 within an aerosol generating article 24 is depleted over time, the temperature of the aerosol generating article 24, and hence of the induction heatable susceptor(s) 28, increases with continued use when the same amount of power is supplied by the power source 18 to the induction coil 30. Since the self-resonant frequency of the induction coil 30 is affected by the temperature of the induction heatable susceptor(s) 28 as explained above, a change in the detected self-resonant frequency or a value calculated based on the value of the detected self-resonant frequency can be used by the controller 20 to determine that the aerosol generating article 24 needs to be replaced.

In one implementation, the controller 20 stores a fourth type of reference value 60 and is arranged to detect a timing change of the aerosol generating article 24 based on the fourth type of reference value 60. The fourth type of reference value 60 is typically a self-resonant frequency range or a range calculated based on the self-resonant frequency range which corresponds to a target temperature range of the induction heatable susceptor(s) 28.

For example, it will be seen in FIG. 5 that if the self-resonant frequency detected by the controller 20 or the value calculated based on the detected self-resonant frequency is less than the fourth type of reference value 60, in other words in Area B, the controller 20 detects that the self-resonant frequency or the value calculated based on the detected self-resonant frequency (and hence the temperature of the induction heatable susceptor(s) 28) is within the normal operating range, thus indicating that there is sufficient humectant and moisture content within the aerosol generating article 24 and that replacement of the aerosol generating article 24 is not yet needed. If, on the other hand, the self-resonant frequency detected by the controller 20 or the value calculated based on the detected self-resonant frequency is greater than the fourth type of reference value 60, in other words in Area A, the controller 20 detects that the self-resonant frequency or the value calculated based on the detected self-resonant frequency (and hence the temperature of the induction heatable susceptor(s) 28) is higher than the normal operating range, thus indicating that there is insufficient humectant and moisture content within the aerosol generating article 24 and that the aerosol generating article 24 needs to be replaced. In these circumstances, the controller 20 can indicate to a user that the aerosol generating article needs to be replaced (for example via a visual alert and/or an audible alert and/or a tactile alert) and/or can cease supplying power to the induction coil 30 from the power source 18 to prevent continued operation of the aerosol generating system 1 with the depleted aerosol generating article 24.

Figure 6:
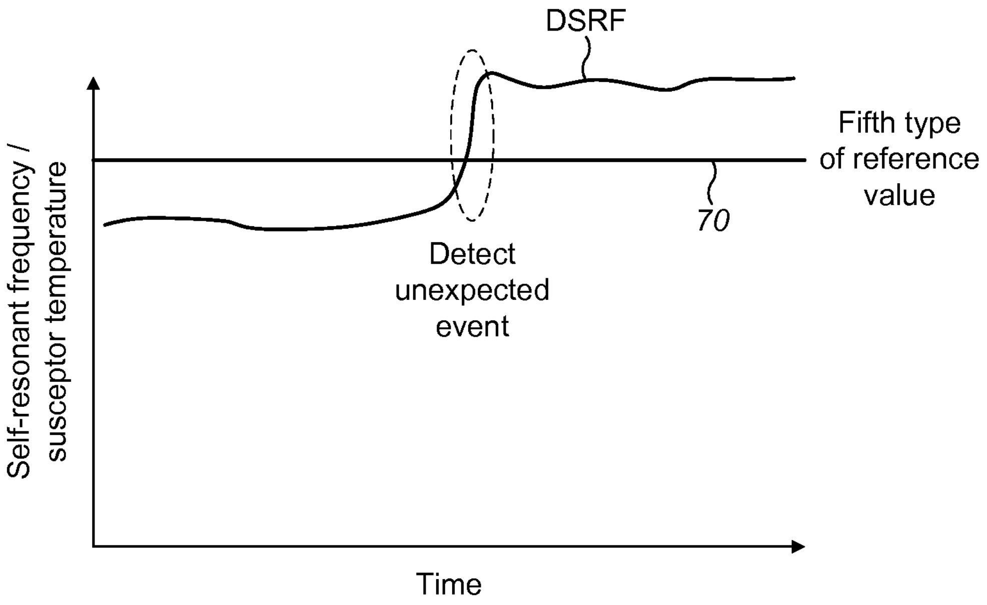
FIG. 6 is a schematic representation of a methodology for detecting an unexpected event during use of the aerosol generating system of FIG. 1.

In a fifth example illustrated in FIG. 6, the controller 20 is arranged to detect an unexpected event based on the detected self-resonant frequency of the induction coil 30 or a value calculated based on the value of the detected self-resonant frequency and based on the amount of power supplied by the power source 18 to the induction coil 30 at the time of detection and/or at least part of a predetermined power profile before the time of detection. The controller 20 is also arranged to indicate the detected unexpected event and/or cease supplying power to the induction coil 30.

The controller 20 stores a fifth type of reference value 70 which is typically a self-resonant frequency or a value calculated based on the value of the self-resonant frequency which corresponds to a target operating temperature of the induction heatable susceptor(s) 28 and is arranged to detect an unexpected event by comparing the detected self-resonant frequency of the induction coil 30 or the value calculated based on the detected self-resonant frequency with the fifth type of reference value 70. Detection of an unexpected event is, thus, based on the methodology described above with reference to FIG. 2.

In a first example, the unexpected event may be that the temperature of the induction heatable susceptor(s) 28 is less than expected, for example less than the target operating temperature. In this first example, the controller 20 detects that the self-resonant frequency of the induction coil 30 or the value calculated based on the detected self-resonant frequency is less than the self-resonant frequency or the value calculated based on the self-resonant frequency corresponding to the fifth type of reference value 70, in other words that it is less than the self-resonant frequency or value which corresponds to the target operating temperature of the induction heatable susceptor(s) 28. This could, for example, occur in the event of attempted use of the aerosol generating system 1 when the ambient temperature is too low.

In a second example, the unexpected event may be that the temperature of the induction heatable susceptor(s) 28 is greater than expected, for example greater than the target operating temperature. In this second example, the controller 20 detects that the self-resonant frequency of the induction coil 30 or the value calculated based on the detected self-resonant frequency is greater than the self-resonant frequency or the value calculated based on the self-resonant frequency corresponding to the fifth type of reference value 70, in other words that it is greater than the self-resonant frequency or value which corresponds to the target operating temperature of the induction heatable susceptor(s) 28. This could, for example, occur in the event of attempted use of the aerosol generating system 1 when the ambient temperature is too high.

It will be understood by one of ordinary skill in the art that the example control methodologies described above with reference to the drawings are not mutually exclusive and that all, or a selection, of the control methodologies can be implemented by the controller 20 to provide enhanced control of the aerosol generating system 1.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Any combination of the above-described features in all possible variations thereof is encompassed by the present disclosure unless otherwise indicated herein or otherwise clearly contradicted by context.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An aerosol generating system for use with an aerosol generating article comprising an aerosol generating material, the aerosol generating system comprising:
- an induction heatable susceptor;
- an induction coil arranged to generate a time varying electromagnetic field for inductively heating the induction heatable susceptor;
- a power source for supplying power to the induction coil; and
- a controller configured to:
  - detect a self-resonant frequency of the induction coil;
  - control operation of the aerosol generating system based on the detected self-resonant frequency;
  - monitor the detected self-resonant frequency;
  - detect, based on the monitoring, an increase in the detected self-resonant frequency;
  - compare the increased detected self-resonant frequency to a timing change reference value;
  - detect a timing change of the aerosol generating article used with the aerosol generating system based on the increased detected self-resonant frequency being greater than the timing change reference value; and
  - indicate the detected timing change and/or cease supplying power to the induction coil when the increased detected self-resonant frequency is greater than the timing change reference value.

2. The aerosol generating system according to claim 1, wherein controlling the operation of the aerosol generating system further comprises controlling an amount of power supplied by the power source to the induction coil based on the detected self-resonant frequency.

3. The aerosol generating system according to claim 2, wherein the controller stores a first type of reference value and is further configured to control the amount of power supplied by the power source to the induction coil based on the first type of reference value.

4. The aerosol generating system according to claim 1, wherein the controller stores a second type of reference value and is further configured to detect a type of aerosol generating article based on the second type of reference value.

5. The aerosol generating system according to claim 4, wherein the controller stores a plurality of the second type of reference values and a corresponding plurality of predetermined heating profiles adapted for use with different types of aerosol generating articles, and the controller is further configured to select one of the plurality of predetermined heating profiles based on the plurality of the second type of reference values and the detected self-resonant frequency.

6. The aerosol generating system according to claim 5, wherein one or more of the plurality of the second type of reference values corresponds to an aerosol generating article that is not suitable for use with the aerosol generating system and the controller is further configured to cease supplying power to the induction coil upon detecting the use of an unsuitable aerosol generating article.

7. The aerosol generating system according to claim 1, wherein the controller is further configured to detect an inhalation by a user of the system based on the detected self-resonant frequency and based on an amount of power supplied by the power source to the induction coil at a time of detection and/or at least part of a predetermined power profile before the time of detection.

8. The aerosol generating system according to claim 7, wherein the controller stores a third type of reference value and is further configured to detect the inhalation by the user based on the third type of reference value.

9. The aerosol generating system according to claim 1, wherein detecting the timing change is further based on at least one of:

an amount of power supplied by the power source to the induction coil at a time of detection, or at least part of a predetermined power profile before the time of detection.

10. The aerosol generating system according to claim 9, wherein the controller stores a fourth type of reference value and is further configured to detect the timing change of the aerosol generating article based on the fourth type of reference value.

11. The aerosol generating system according to claim 1, wherein the controller is further configured to:

detect an unexpected event based on the detected self-resonant frequency and based on an amount of power supplied by the power source to the induction coil at a time of the detection and/or at least part of a predetermined power profile before the time of the detection; and indicate the detected unexpected event and/or cease supplying power to the induction coil, wherein the unexpected event corresponds to a temperature of the induction heatable susceptor being greater than or less than a fifth type of reference value.

12. The aerosol generating system according to claim 11, wherein the controller stores the fifth type of reference value and is further configured to detect the unexpected event based on the fifth type of reference value.

13. The aerosol generating system of claim 1, wherein the induction heatable susceptor controls the self-resonant frequency of the induction coil based on at least one of a material or thickness of the induction heatable susceptor.

14. The aerosol generating system of claim 1, wherein:

the induction coil and the induction heatable susceptor form a tuned circuit, the tuned circuit is based on an amount of power supplied to the induction coil by the power source, and the amount of power supplied is based on the detected self-resonant frequency of the induction coil.

15. The aerosol generating system of claim 1, wherein the self-resonant frequency of the induction coil varies.

16. The aerosol generating system of claim 1, wherein the controller is further configured to detect a type of aerosol-generating article used in the aerosol generating system based on the detected self-resonant frequency of the induction coil when at least one of: the induction coil is supplied with a predetermined amount of power, or the induction coil is operated according to a predetermined power profile.

17. An aerosol generating device for use with an aerosol generating article comprising an aerosol generating material, the aerosol generating device comprising:

a space for receiving an aerosol generating article;

a tuned circuit comprising an induction coil arranged to generate a time varying electromagnetic field and an induction heatable susceptor for controlling a self-resonant frequency of the induction coil;

a power source for supplying power to the induction coil; and a controller configured to:

detect the self-resonant frequency of the induction coil;

control operation of the aerosol generating device based on the detected self-resonant frequency;

monitor the detected self-resonant frequency;

detect, based on the monitoring, an increase in the detected self-resonant frequency;

compare the increased detected self-resonant frequency to a fourth type of reference value;

detect a timing change of the aerosol generating article used with the aerosol generating device based on the increased detected self-resonant frequency being greater than the fourth type of reference value; and indicate the detected timing change and/or cease supplying power to the induction coil when the increased detected self-resonant frequency is greater than the fourth type of reference value.

18. The aerosol generating device of claim 17, wherein the controller is further configured to detect a type of aerosol-generating article used in the aerosol generating device based on the detected self-resonant frequency of the induction coil when at least one of:

the induction coil is supplied with a predetermined amount of power, or the induction coil is operated according to a predetermined power profile.

* * * * *